(12) United States Patent
Skaria et al.

(10) Patent No.: US 8,825,594 B2
(45) Date of Patent: Sep. 2, 2014

(54) CACHING INFRASTRUCTURE

(75) Inventors: Simon Skaria, Sammamish, WA (US);
Naresh Kannan, Seattle, WA (US);
Simon Peter Clarke, Seattle, WA (US);
Miko Arnab Sakhya Singha Bose,
Seattle, WA (US); Christopher J. Antos,
Bellevue, WA (US); Mark Rolland Knight, Bellevue, WA (US); Andrew G. Carlson, Redmond, WA (US); Don Adam Hedgpeth, Redmond, WA (US);
Mitesh Pankaj Patel, Seattle, WA (US);
Andrew Sean Watson, Seattle, WA (US); Jonathan B. Bailor, Bellevue, WA (US); Elena Petrova, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 130 days.

(21) Appl. No.: 12/117,025

(22) Filed: May 8, 2008

(65) Prior Publication Data
US 2009/0282041 A1 Nov. 12, 2009

(51) Int. Cl.
*G06F 7/00* (2006.01)
*G06F 17/00* (2006.01)
*G06F 17/30* (2006.01)
*G06F 12/00* (2006.01)

(52) U.S. Cl.
USPC .......................... 707/608; 707/704; 707/822

(58) Field of Classification Search
USPC ......... 707/704, 703, 608, 622, 802, 812, 821, 707/822
See application file for complete search history.

(56) References Cited

U.S. PATENT DOCUMENTS

| 4,855,580 A | 8/1989 | Van Maanen, Jr. |
| 5,107,443 A | 4/1992 | Smith et al. |

(Continued)

FOREIGN PATENT DOCUMENTS

| CN | 1276568 A | 12/2000 |
| CN | 1489075 | 4/2004 |

(Continued)

OTHER PUBLICATIONS

International Search Report and Written Opinion for PCT/US2008/081456 / MS 321449.02 mailed Mar. 31, 2009.

(Continued)

*Primary Examiner* — Tony Mahmoudi
*Assistant Examiner* — Merilyn Nguyen
(74) *Attorney, Agent, or Firm* — Thomas Wong; Jim Ross; Micky Minhas

(57) ABSTRACT

Example systems and methods are directed at maintaining and retrieving presence metadata. One example method includes receiving a request from a first client to edit a document file, and sending short-term check out metadata to the first client to begin an editing session. The method also includes writing the transition ID to a transition table stored in a cache, wherein the presence of another transition ID in the cache indicates that a document has switched from a single-client mode to a multi-client mode. An example system includes a processing unit operative to receive a document, the document including short-term check out metadata indicating an editing session has begun, ping a cache to determine if another transition ID is stored in the cache, and send a transition ID to a transition table stored in a cache to switch from a single-client mode to a multi-client mode.

20 Claims, 7 Drawing Sheets

(56) References Cited

U.S. PATENT DOCUMENTS

| | | | |
|---|---|---|---|
| 5,142,619 A | 8/1992 | Webster, III | |
| 5,313,394 A | 5/1994 | Clapp | |
| 5,339,389 A | 8/1994 | Bates et al. | |
| 5,446,842 A | 8/1995 | Schaeffer | |
| 5,486,686 A | 1/1996 | Zdybel | |
| 5,535,332 A | 7/1996 | Ishida | |
| 5,568,640 A | 10/1996 | Nishiyama et al. | |
| 5,623,659 A | 4/1997 | Shi et al. | |
| 5,630,138 A | 5/1997 | Raman | |
| 5,664,186 A | 9/1997 | Bennett et al. | |
| 5,671,428 A | 9/1997 | Muranaga et al. | |
| 5,692,178 A | 11/1997 | Shaughnessy | |
| 5,729,734 A | 3/1998 | Parker | |
| 5,751,958 A | 5/1998 | Zweben | |
| 5,781,732 A | 7/1998 | Adams | |
| 5,781,908 A | 7/1998 | Williams et al. | |
| 5,787,262 A | 7/1998 | Shakib et al. | |
| 5,835,950 A * | 11/1998 | Cho et al. | 711/144 |
| 5,893,126 A | 4/1999 | Drews et al. | |
| 5,963,931 A | 10/1999 | Fagg | |
| 6,000,945 A | 12/1999 | Sanchez-Lazer | |
| 6,006,239 A | 12/1999 | Bhansali et al. | |
| 6,026,461 A * | 2/2000 | Baxter et al. | 710/244 |
| 6,055,546 A | 4/2000 | Pongracz et al. | |
| 6,065,026 A | 5/2000 | Cornelia | |
| 6,067,551 A | 5/2000 | Brown et al. | |
| 6,073,161 A | 6/2000 | DeBoskey et al. | |
| 6,088,702 A | 7/2000 | Plantz | |
| 6,202,085 B1 | 3/2001 | Benson et al. | |
| 6,209,010 B1 | 3/2001 | Gauthier | |
| 6,209,128 B1 | 3/2001 | Gerard et al. | |
| 6,240,414 B1 | 5/2001 | Beizer et al. | |
| 6,244,575 B1 | 6/2001 | Vaartstra et al. | |
| 6,275,935 B1 | 8/2001 | Barlow | |
| 6,317,777 B1 | 11/2001 | Skarbo et al. | |
| 6,324,544 B1 | 11/2001 | Alam et al. | |
| 6,327,584 B1 | 12/2001 | Xian et al. | |
| 6,327,611 B1 | 12/2001 | Everingham | |
| 6,341,291 B1 | 1/2002 | Bentley et al. | |
| 6,342,906 B1 | 1/2002 | Kumar et al. | |
| 6,363,352 B1 | 3/2002 | Dailey et al. | |
| 6,411,965 B2 | 6/2002 | Klug | |
| 6,430,576 B1 | 8/2002 | Gates et al. | |
| 6,438,548 B1 | 8/2002 | Grim, III et al. | |
| 6,438,563 B1 | 8/2002 | Kawagoe | |
| 6,438,564 B1 | 8/2002 | Morton et al. | |
| 6,446,093 B2 | 9/2002 | Tabuchi | |
| 6,502,113 B1 | 12/2002 | Crawford et al. | |
| 6,526,434 B1 | 2/2003 | Carlson et al. | |
| 6,529,905 B1 | 3/2003 | Bray et al. | |
| 6,560,614 B1 | 5/2003 | Barboy et al. | |
| 6,560,620 B1 | 5/2003 | Ching | |
| 6,574,377 B1 | 6/2003 | Cahill | |
| 6,610,104 B1 | 8/2003 | Lin | |
| 6,662,209 B2 | 12/2003 | Potts, Jr. et al. | |
| 6,678,882 B1 | 1/2004 | Hurley et al. | |
| 6,681,371 B1 | 1/2004 | Devanbu | |
| 6,681,382 B1 | 1/2004 | Kakumani | |
| 6,687,878 B1 | 2/2004 | Eintracht et al. | |
| 6,711,718 B2 | 3/2004 | Pfeil et al. | |
| 6,751,618 B1 | 6/2004 | Germscheid et al. | |
| 6,757,678 B2 | 6/2004 | Myllymaki | |
| 6,757,696 B2 | 6/2004 | Multer et al. | |
| 6,757,767 B1 | 6/2004 | Kelleher | |
| 6,757,871 B1 | 6/2004 | Sato et al. | |
| 6,760,840 B1 | 7/2004 | Shimbo et al. | |
| 6,772,165 B2 | 8/2004 | O'Carroll | |
| 6,842,768 B1 | 1/2005 | Shaffer et al. | |
| 6,854,087 B1 | 2/2005 | Takeo et al. | |
| 6,925,476 B1 | 8/2005 | Multer | |
| 6,976,213 B1 | 12/2005 | Letourneau et al. | |
| 6,983,416 B1 | 1/2006 | Bae | |
| 6,993,522 B2 | 1/2006 | Chen et al. | |
| 7,007,235 B1 | 2/2006 | Hussein et al. | |
| 7,024,429 B2 | 4/2006 | Ngo et al. | |
| 7,024,430 B1 | 4/2006 | Ingraham et al. | |
| 7,035,839 B1 | 4/2006 | Gillespie et al. | |
| 7,039,679 B2 | 5/2006 | Mendez et al. | |
| 7,047,407 B2 | 5/2006 | Itoh et al. | |
| 7,058,663 B2 | 6/2006 | Johnston et al. | |
| 7,065,633 B1 * | 6/2006 | Yates et al. | 712/227 |
| 7,069,505 B2 | 6/2006 | Tamano | |
| 7,089,278 B1 | 8/2006 | Churchill et al. | |
| 7,110,936 B2 | 9/2006 | Hiew | |
| 7,111,237 B2 | 9/2006 | Chan | |
| 7,117,278 B2 | 10/2006 | Avery | |
| 7,124,151 B1 | 10/2006 | Choi | |
| 7,124,362 B2 | 10/2006 | Tischer | |
| 7,127,501 B1 | 10/2006 | Beir et al. | |
| 7,149,776 B1 | 12/2006 | Roy et al. | |
| 7,155,465 B2 | 12/2006 | Lee et al. | |
| 7,185,277 B1 | 2/2007 | Bernstein et al. | |
| 7,200,668 B2 | 4/2007 | Mak | |
| 7,203,708 B2 | 4/2007 | Liu et al. | |
| 7,209,948 B2 | 4/2007 | Srinivasa | |
| 7,225,189 B1 | 5/2007 | McCormack et al. | |
| 7,240,091 B1 | 7/2007 | Hopmann et al. | |
| 7,242,389 B1 | 7/2007 | Stern | |
| 7,249,314 B2 | 7/2007 | Walker | |
| 7,293,049 B2 | 11/2007 | Kadyk et al. | |
| 7,310,657 B2 | 12/2007 | Nakamura | |
| 7,315,978 B2 | 1/2008 | Giles et al. | |
| 7,328,243 B2 * | 2/2008 | Yeager et al. | 709/205 |
| 7,346,705 B2 | 3/2008 | Hullot et al. | |
| 7,401,291 B2 | 7/2008 | Ramaley et al. | |
| 7,487,471 B2 | 2/2009 | Wu | |
| 7,496,577 B2 | 2/2009 | Williamson | |
| 7,529,780 B1 | 5/2009 | Braginsky et al. | |
| 7,536,641 B2 | 5/2009 | Rosenstein et al. | |
| 7,565,603 B1 | 7/2009 | Jones et al. | |
| 7,577,906 B2 | 8/2009 | Friedrichowitz | |
| 7,594,163 B2 | 9/2009 | Slack-Smith | |
| 7,603,357 B1 | 10/2009 | Gourdol | |
| 7,610,287 B1 | 10/2009 | Dean et al. | |
| 7,647,292 B2 | 1/2010 | Hayashi | |
| 7,650,336 B1 * | 1/2010 | Herrmann et al. | 707/704 |
| 7,664,750 B2 * | 2/2010 | Frees et al. | 707/608 |
| 7,694,217 B2 | 4/2010 | Croft | |
| 7,714,222 B2 | 5/2010 | Taub | |
| 7,761,784 B2 | 7/2010 | Parks et al. | |
| 7,779,347 B2 | 8/2010 | Christiansen et al. | |
| 7,788,326 B2 | 8/2010 | Buchheit et al. | |
| 7,792,788 B2 * | 9/2010 | Melmon et al. | 707/608 |
| 7,797,274 B2 | 9/2010 | Strathearn et al. | |
| 7,801,951 B2 | 9/2010 | Fishkin et al. | |
| 7,818,678 B2 | 10/2010 | Massand | |
| 7,831,679 B2 * | 11/2010 | Apacible et al. | 709/209 |
| 7,839,532 B2 | 11/2010 | Brawn et al. | |
| 7,912,811 B2 * | 3/2011 | Hodel-Widmer | 707/608 |
| 7,933,952 B2 | 4/2011 | Parker et al. | |
| 7,941,399 B2 | 5/2011 | Bailor et al. | |
| 7,962,853 B2 | 6/2011 | Bedi et al. | |
| 7,966,556 B1 | 6/2011 | Bourdev | |
| 8,019,780 B1 | 9/2011 | Pinkerton et al. | |
| 8,028,229 B2 | 9/2011 | Bailor et al. | |
| 8,082,277 B1 | 12/2011 | O'Brien et al. | |
| 2001/0018697 A1 | 8/2001 | Kunitake et al. | |
| 2001/0042075 A1 | 11/2001 | Tabuchi | |
| 2002/0007287 A1 | 1/2002 | Straube et al. | |
| 2002/0059325 A1 | 5/2002 | Beizer et al. | |
| 2002/0065848 A1 | 5/2002 | Walker et al. | |
| 2002/0069192 A1 | 6/2002 | Aegerter | |
| 2002/0188598 A1 | 12/2002 | Myllymaki | |
| 2003/0028600 A1 | 2/2003 | Parker | |
| 2003/0093760 A1 | 5/2003 | Suzuki et al. | |
| 2003/0097410 A1 | 5/2003 | Atkins | |
| 2003/0097638 A1 | 5/2003 | Tamano | |
| 2003/0115481 A1 | 6/2003 | Baird | |
| 2003/0140067 A1 | 7/2003 | Sesek et al. | |
| 2003/0159105 A1 | 8/2003 | Hiebert | |
| 2003/0167281 A1 | 9/2003 | Cohen et al. | |
| 2003/0172113 A1 | 9/2003 | Cameron et al. | |
| 2003/0172168 A1 | 9/2003 | Mak et al. | |
| 2003/0208534 A1 | 11/2003 | Carmichael | |

(56) References Cited

U.S. PATENT DOCUMENTS

| | | |
|---|---|---|
| 2004/0039829 A1 | 2/2004 | Bucher |
| 2004/0068505 A1 | 4/2004 | Lee et al. |
| 2004/0107224 A1 | 6/2004 | Bera |
| 2004/0122870 A1 | 6/2004 | Park et al. |
| 2004/0122898 A1 | 6/2004 | Srinivasa |
| 2004/0122912 A1 | 6/2004 | Kim et al. |
| 2004/0133858 A1 | 7/2004 | Barnett |
| 2004/0143630 A1 | 7/2004 | Kaufmann et al. |
| 2004/0172395 A1 | 9/2004 | Edelstein et al. |
| 2004/0177343 A1 | 9/2004 | McVoy et al. |
| 2004/0199550 A1 | 10/2004 | Ito et al. |
| 2004/0205539 A1 | 10/2004 | Mak et al. |
| 2004/0205653 A1 | 10/2004 | Hadfield et al. |
| 2004/0230903 A1 | 11/2004 | Elza et al. |
| 2004/0239700 A1 | 12/2004 | Baschy |
| 2004/0243644 A1 | 12/2004 | Steere et al. |
| 2004/0250201 A1 | 12/2004 | Caspi |
| 2005/0004990 A1 | 1/2005 | Durazo |
| 2005/0022122 A1 | 1/2005 | Barrus et al. |
| 2005/0033811 A1 | 2/2005 | Bhogal et al. |
| 2005/0064858 A1 | 3/2005 | Makela et al. |
| 2005/0071386 A1 | 3/2005 | Wolfgang |
| 2005/0097440 A1 | 5/2005 | Lusk et al. |
| 2005/0177617 A1 | 8/2005 | Banginwar et al. |
| 2005/0198132 A1 | 9/2005 | Vellante et al. |
| 2005/0203962 A1 | 9/2005 | Zhou et al. |
| 2005/0210392 A1 | 9/2005 | Koide |
| 2005/0216524 A1 | 9/2005 | Gomes et al. |
| 2005/0223066 A1 | 10/2005 | Buchheit et al. |
| 2005/0234943 A1 | 10/2005 | Clarke |
| 2005/0240858 A1 | 10/2005 | Croft et al. |
| 2005/0251738 A1 | 11/2005 | Hirano et al. |
| 2005/0256907 A1 | 11/2005 | Novik et al. |
| 2005/0262203 A1 | 11/2005 | Buchheit et al. |
| 2005/0289512 A1 | 12/2005 | Matsusaka |
| 2006/0015539 A1 | 1/2006 | Wolf et al. |
| 2006/0015811 A1 | 1/2006 | Tanaka et al. |
| 2006/0020360 A1 | 1/2006 | Wu |
| 2006/0031264 A1 | 2/2006 | Bosworth et al. |
| 2006/0041579 A1 | 2/2006 | Miyashita et al. |
| 2006/0041596 A1 | 2/2006 | Stirbu et al. |
| 2006/0047656 A1 | 3/2006 | Dehlinger et al. |
| 2006/0053194 A1 | 3/2006 | Schneider |
| 2006/0053195 A1 | 3/2006 | Schneider et al. |
| 2006/0080432 A1 | 4/2006 | Spataro et al. |
| 2006/0085402 A1 | 4/2006 | Brown et al. |
| 2006/0101328 A1 | 5/2006 | Albornoz |
| 2006/0106879 A1 | 5/2006 | Zondervan et al. |
| 2006/0123033 A1 | 6/2006 | Livshits |
| 2006/0136511 A1 | 6/2006 | Ngo et al. |
| 2006/0136809 A1 | 6/2006 | Fernstrom |
| 2006/0200755 A1 | 9/2006 | Melmon et al. |
| 2006/0218476 A1 | 9/2006 | Gombert |
| 2006/0242549 A1 | 10/2006 | Schwier et al. |
| 2006/0248038 A1 | 11/2006 | Kaplan |
| 2006/0259524 A1 | 11/2006 | Horton |
| 2006/0265377 A1 | 11/2006 | Raman et al. |
| 2007/0016650 A1 | 1/2007 | Gilbert et al. |
| 2007/0066293 A1 | 3/2007 | Peng |
| 2007/0118598 A1 | 5/2007 | Bedi et al. |
| 2007/0118794 A1 | 5/2007 | Hollander et al. |
| 2007/0130334 A1 | 6/2007 | Carley |
| 2007/0156672 A1 | 7/2007 | Wolff et al. |
| 2007/0186157 A1 | 8/2007 | Walker et al. |
| 2007/0186171 A1 | 8/2007 | Junuzovic et al. |
| 2007/0198952 A1 | 8/2007 | Pittenger |
| 2007/0203917 A1 | 8/2007 | Du et al. |
| 2007/0226320 A1 | 9/2007 | Hager et al. |
| 2007/0226604 A1 | 9/2007 | Chalasani et al. |
| 2007/0271502 A1 | 11/2007 | Bedi et al. |
| 2007/0283321 A1 | 12/2007 | Hegde |
| 2008/0028300 A1 | 1/2008 | Krieger et al. |
| 2008/0052634 A1 | 2/2008 | Fishkin et al. |
| 2008/0059187 A1 | 3/2008 | Roitblat et al. |
| 2008/0059539 A1 | 3/2008 | Chin |
| 2008/0072141 A1 | 3/2008 | Hodel-Widmer |
| 2008/0086718 A1 | 4/2008 | Bostic et al. |
| 2008/0097993 A1 | 4/2008 | Nanba |
| 2008/0098294 A1 | 4/2008 | Le |
| 2008/0114740 A1 | 5/2008 | Vergottini |
| 2008/0126953 A1 | 5/2008 | Davidson et al. |
| 2008/0147590 A1 | 6/2008 | Bechtel et al. |
| 2008/0177782 A1 | 7/2008 | Poston |
| 2008/0180740 A1 | 7/2008 | Kimura et al. |
| 2008/0195800 A1 | 8/2008 | Lee |
| 2008/0222159 A1* | 9/2008 | Aranha et al. .................. 707/10 |
| 2008/0235579 A1 | 9/2008 | Champion et al. |
| 2008/0256113 A1 | 10/2008 | Rasmussen et al. |
| 2008/0256114 A1 | 10/2008 | Rasmussen et al. |
| 2008/0263032 A1 | 10/2008 | Vailaya et al. |
| 2008/0270386 A1 | 10/2008 | Ohi et al. |
| 2008/0294895 A1 | 11/2008 | Bodner |
| 2008/0320384 A1 | 12/2008 | Nagarajan |
| 2009/0006936 A1 | 1/2009 | Parker |
| 2009/0006946 A1 | 1/2009 | Hanson |
| 2009/0006948 A1 | 1/2009 | Parker |
| 2009/0063489 A1* | 3/2009 | Neumann et al. .................. 707/8 |
| 2009/0094231 A1 | 4/2009 | Marvit et al. |
| 2009/0094242 A1 | 4/2009 | Lo et al. |
| 2009/0125518 A1* | 5/2009 | Bailor et al. ....................... 707/8 |
| 2009/0157811 A1 | 6/2009 | Bailor et al. |
| 2009/0171987 A1 | 7/2009 | Coppinger et al. |
| 2009/0193331 A1 | 7/2009 | Croft et al. |
| 2009/0228473 A1 | 9/2009 | Kannan et al. |
| 2009/0235158 A1 | 9/2009 | Rosenstein et al. |
| 2009/0249224 A1 | 10/2009 | Davis et al. |
| 2009/0271696 A1 | 10/2009 | Bailor et al. |
| 2009/0282462 A1 | 11/2009 | Skaria |
| 2009/0327294 A1 | 12/2009 | Bailor |
| 2010/0023562 A1 | 1/2010 | Kreuch et al. |
| 2010/0070464 A1 | 3/2010 | Aymeloglu et al. |
| 2010/0088676 A1 | 4/2010 | Yuan |
| 2010/0095198 A1 | 4/2010 | Bultrowicz et al. |
| 2010/0131836 A1 | 5/2010 | Dukhon et al. |
| 2010/0278453 A1 | 11/2010 | King |
| 2010/0281074 A1 | 11/2010 | Bailor et al. |
| 2011/0055702 A1 | 3/2011 | Jakobson |
| 2011/0184906 A1 | 7/2011 | Bailor et al. |
| 2012/0254315 A1 | 10/2012 | Skaria et al. |
| 2012/0278276 A1 | 11/2012 | Bailor et al. |
| 2013/0297559 A1 | 11/2013 | Bailor et al. |

FOREIGN PATENT DOCUMENTS

| | | |
|---|---|---|
| CN | 1804836 | 7/2006 |
| CN | 101042702 | 9/2007 |
| DE | 19844071 A1 | 4/1999 |
| EP | 1132847 A2 | 9/2001 |
| EP | 1290575 | 6/2005 |
| EP | 1681652 A2 | 7/2006 |
| JP | Hei 1-113849 | 5/1989 |
| JP | Hei 0785020 | 3/1995 |
| JP | 11-161535 | 6/1999 |
| JP | 2000-076109 | 3/2000 |
| JP | 2000259623 | 9/2000 |
| JP | 2001-290690 | 10/2001 |
| JP | 2002288029 | 10/2002 |
| JP | 2003-233520 | 8/2003 |
| JP | 2004-78535 | 3/2004 |
| JP | 2004065193 | 9/2004 |
| JP | 2004-326176 | 11/2004 |
| JP | 2005-74724 | 3/2005 |
| JP | 2005267021 | 9/2005 |
| JP | 2005-301838 | 10/2005 |
| JP | 2005310158 A | 11/2005 |
| JP | 2006-195972 | 7/2006 |
| JP | 2006236350 | 9/2006 |
| JP | 2007115131 | 5/2007 |
| JP | 2007257629 | 10/2007 |
| JP | 200810192 | 9/2008 |
| JP | 20099410 | 1/2009 |
| KR | 10-0331685 | 4/2002 |
| KR | 10-2006-0047218 A | 5/2006 |
| RU | 2250492 C2 | 4/2005 |

(56) References Cited

FOREIGN PATENT DOCUMENTS

| | | |
|---|---|---|
| RU | 50695 U1 | 1/2006 |
| RU | 2272316 C2 | 3/2006 |
| RU | 2005135951 A | 5/2007 |
| RU | 2304803 C2 | 8/2007 |
| RU | 2327206 C1 | 6/2008 |
| RU | 2344468 C2 | 1/2009 |
| TW | 200424868 | 11/2004 |
| TW | 200627259 | 8/2006 |
| TW | 200627274 | 8/2006 |
| TW | I276325 | 3/2007 |
| TW | 200817998 | 4/2008 |
| TW | 200910880 | 3/2009 |
| WO | WO 01/25986 | 4/2001 |
| WO | WO 01/33362 A1 | 5/2001 |
| WO | WO 01/88750 | 11/2001 |
| WO | WO 02/033575 | 4/2002 |
| WO | WO 03/058374 | 7/2003 |
| WO | WO 2005/114467 A2 | 12/2005 |
| WO | WO 2007/034858 A1 | 3/2007 |
| WO | WO 2007/062949 | 6/2007 |
| WO | WO 2007/064480 | 6/2007 |
| WO | WO 2009/005922 | 1/2009 |
| WO | WO 2009/061638 | 5/2009 |
| WO | WO 2009/076010 | 6/2009 |
| WO | WO 2009/079116 | 6/2009 |
| WO | WO 2009/134548 | 11/2009 |
| WO | WO 2009/154842 | 12/2009 |
| WO | WO2009/158108 | 12/2009 |
| WO | WO 2009/158172 | 12/2009 |

OTHER PUBLICATIONS

US Office Action (Non-Final) for U.S. Appl. No. 11/938,082, mailed Dec. 28, 2009.
Adkins et al.; GSS Collaboration in Document Development: Using Group Writer to Improve the Process, Proceedings of the 32nd Hawaii International Conference on System Sciences, Copyright © 1999 IEEE, 11 pages.
International Search Report and Written Opinion for PCT/US2009/039316, mailed Jan. 18, 2010, 11 pages.
International Search Report and Written Opinion for PCT/US2008/083862 / MS 321998.02 mailed Mar. 31, 2009, 11 pages.
Synchronous Collaborative Text Document Editing Online: MoonEdit, reviewed Sep. 13, 2007, pp. 104, http://www.masternewmedia.org/news/2005/02/20/synchronous_collaborative_text_document-editing.htm.
US Office Action (Non-Final) for U.S. Appl. No. 11/957,010, mailed Mar. 18, 2010, 32 pages.
"File Locks-GNU Emacs Lisp Reference Manual"; www.gnu.org/software/emacs/elisp/html_node/File-Locks.html; Mar. 28, 2006; 2 pages.
Miller et al.; "Interactive Simultaneous Editing of Multiple Text Regions"; www.co-ode.org/resources/papers/k-cap2007-seidenberg.pdf; Jun. 2001; 15 pages.
Seidenberg et al; "A Methodology for Asynchronous MultiUser Editing of Semantic Web Ontologies"; www.xmpp.org/extensions/xep-0058.html; Mar. 28, 2006; 8 pages.
Shchepin; "XEP-0058: Multi-User Text Editing"; http://groups.csail.mit.edu/uid/projects/simuledit/usenix01.pdf; Oct. 9, 2007; 5 pages.
"Codeville," http://codeville.org/, 2 pages (Date Retrieved Oct. 9, 2007).
"Google, Google Docs & Spreadsheets Tour" downloaded from http://www.google.com/google-d-s/intl/en/tour2.html on Nov. 9, 2007 (1 page).
"Status of Software Reuse 577," http://www.plex86.org/Computer_Folklore/Status-of-Software-Reuse-577.html, 2 pages (Date Retrieved Oct. 9, 2007).
Adler et al., "Evaluating and Implementing a Collaborative Office Document System," 2005, pp. 1-18, http://www.sce.carleton.ca/faculty/adler/publications/2005/adler-nash-noel-2005-Collab-Office.pdf.

Citro et al., "Conflict Management for Real-Time Collaborative Editing in Mobile Replicated Architectures," School of Computer Science and Information Technology, RMIT University, Melbourne, Victoria, Australia, Australian Computer Society, Inc. © 2007, pp. 1-10, http://www.crpit.com/confpapers/CRPITV62Citro.pdf.
Galli, R., "Journal File Systems in Linux," http://bulma.net/impresion.phtml?nIdNoticia=1154, 15 pages. (Jan. 24, 2002).
Green, Bob, "Converting Qedit to the Client/Server Model", http://www.robelle.com/library/papers/client-server/, 14 pages (Copyright 2004).
Haake et al., "Collaborative Authoring of Hypermedia Documents," Machine Translation Today, Translating and the Compute 15, pp. 41-58, Aslib:London 1993, pp. 1-18, http://www.pi6.fernuni-hagen.de/publ/MT-93.pdf.
Hebsgarrd, Poul J; Process Driven Document Management198, Version 6.1, Feb. 2007, pp. 1-13, http://www.brain-technology.com/upload/file_vk306c6tr779p9gntgho_16467.pdf.
Ignat et al., "Extending Real-Time Collaborative Editing Systems with Asynchronous Communication," Institute for Information Systems, ETH Zurich, (at least as early as Oct. 4, 2007) pp. 1-6, http://www.inf.ethz.ch/personal/ignat/Publications/cscwd_04.pdf.
Koch, Michael, "Design Issues and Model for a Distributed Multi-User Editor" (pp. 1-21), from *Computer Supported Cooperative Work, An International Journal*, 3(3-4), 19995, pp. 359-378.
La Fontaine, Robin, Monsell EDM Ltd., Merging XML Files: a new approach providing intelligent merge of XML data sets, Presented at XML Europe 2002, 21 pages, http://www.deltaxml.com/dxml/93/version/default/part/AttachmentData/data/merging-xml-files.pdf.
Microsoft Corporation, Compare and Merge Mechanisms, © 2007, 1 page, http://msdn2.microsoft.com/en-us/library/ek8hk7e2(VS.80,d=printer).aspx.
Pacull et al., "Duplex: A Distributed Collaborative Editing Environment in Large Scale" *Proceedings of the Conference on Computer Supported Cooperative Work*, Oct. 22-26, 1994, Chapel Hill, NC, USA. ACM, 1994; pp. 165-173.
Preston et al., "Synchronous Editing via Web Services: Combining Heterogeneous Client and Server Technologies," Department of Computer Science, Georgia State University, Atlanta, Georgia, *CSCW 2006*, Nov. 4-8, 2006, Banff, Alberta, Canada, pp. 1-2. http://cims.clayton.edu/jpreston/PhD/Research/Preston%20-%20CSCW%20Demo%20Extended%20Abstract.pdf.
Synchronous Collaborative Text Document Editing Online: MoonEdit, reviewed Sep. 13, 2007, pp. 1-4, http://www.masternewmedia.org/news/2005/02/20/synchronous_collaborative_text_document_editing.htm.
Tichy, Walter F., RCS—A System for Version Control, Jan. 3, 1991, 20 pages, http://www.svlug.org/teams/rcs.pdf.
U.S. Appl. No. 11/938,082, filed Nov. 9, 2007, Confirmation No. 3133.
U.S. Appl. No. 11/951,973, filed Dec. 6, 2007, Confirmation No. 9364.
U.S. Appl. No. 11/957,010, filed Dec. 14, 2007, Confirmation No. 8535.
U.S. Appl. No. 12/044,744, filed Mar. 7, 2008, Confirmation No. 7862.
U.S. Appl. No. 12/111,174, filed Apr. 28, 2008, Confirmation No. 6839.
U.S. Appl. No. 12/117,040, filed May 8, 2008, Confirmation No. 8262.
Google, "Share and Collaborate in Real Time," 2008, 1 page, http://www.google.com/google-d-s/intl/en/tour2.html.
McKechan et al., "Design Considerations for Creditor: A Collaborative Report Writing Editor," 10 pages, accessed May 16, 2008, http://userpages.umbc.edu/~jcampbel/Group01/McKechan_paper_iwces3.pdf.
U.S. Appl. No. 12/145,536, filed Jun. 25, 2008, Bailor et al., Confirmation No. 3462, 20 pages.
US Non-Final Office Action for U.S. Appl. No. 12/044,744 mailed Jul. 26, 2010.
US Non-Final Office Action for U.S. Appl. No. 11/951,973 mailed Jan. 19, 2011.
Ohst et al., Difference Tools for Analysis and Design Documents, IEEE 2003, pp. 1-10.

(56) References Cited

OTHER PUBLICATIONS

Lu et al., Merging Retrieval Results in Hierarchical Peer-to-Peer Networks, ACM 2004, pp. 472-473.
Heckel, A Technique for Isolating Differences between Files, ACM 1978, pp. 264-268.
US Final Office Action for U.S. Appl. No. 11/957,010 mailed Aug. 18, 2010.
International Preliminary Report and Written Opinion for PCT/US/2008/083069/MS 321999.02 mailed Jun. 24, 2010, 6 pages.
US Final Office Action for U.S. Appl. No. 11/938,082, mailed Jun. 29, 2010, 28 pages.
US Final Office Action for U.S. Appl. No. 11/957,010, mailed Aug. 18, 2010, 25 pages.
US Final Office Action for U.S. Appl. No. 12/044,744 mailed Nov. 22, 2010, 14 pages.
US Non-Final Office Action for U.S. Appl. No. 12/145,536 mailed Nov. 8, 2010, 27 pages.
US Notice of Allowance for U.S. Appl. No. 11/938,082, mailed Jan. 4, 2011, 23 pgs.
US Final Office Action for U.S. Appl. No. 12/145,536, mailed Apr. 26, 2011, 34 pgs.
US Non-Final Office Action for U.S. Appl. No. 12/111,174, mailed Jun. 8, 2011, 35 pgs.
Wilde, Erik, "Multi-User Multimedia Editing with the MultimETH System," Swiss Federal Institute of Technology, CH 8092, Zurich, (at least as early as Oct. 10, 2007) pp. 1-9, http://dret.net/netdret/docs/wilde-tikrep18.pdf.
International Search Report and Written Opinion for PCT/US2009/037920 mailed Nov. 30, 2009, 11 pages.
International Search Report and Written Opinion for PCT/US2009/045558 mailed Nov. 30, 2009, 11 pages.
U.S. Appl. No. 12/145,536, Amendment and Response filed Feb. 8, 2011. 18 pgs.
U.S. Appl. No. 12/145,536, Amendment and Response filed Jul. 26, 2011, 19 pgs.
U.S. Appl. No. 12/145,536, Office Action mailed Aug. 1, 2011, 37 pgs.
U.S. Appl. No. 11/938,082, Amendment and Response filed Mar. 25. 2010, 15 pgs.
U.S. Appl. No. 11/938,082, Amendment and Response filed Aug. 4, 2010. 14 pgs.
U.S. Appl. No. 11/951,973, Amendment and Response filed Apr. 13, 2011, 11 pgs.
U.S. Appl. No. 11/957,010 Amendment and Response filed Jun. 2, 2010, 12 pgs.
U.S. Appl. No. 11/957,010 Amendment and Response filed Nov. 17, 2010, 11 pgs.
U.S. Appl. No. 12/044,744 Amendment and Response filed Oct. 26, 2010, 11 pgs.
U.S. Appl. No. 12/044,744 Amendment and Response filed Feb. 22, 2011. 11 pgs.
U.S. Appl. No. 12/044,744 Amendment and Response filed Jun. 24, 2011, 11 pgs.
Bellagio, David et al., "Software Configuration Management Strategies and IBM Rational ClearCase A Practical Introduction, Second Edition" in: "Software Configuration Management Strategies and IBM Rational ClearCase A Practical Introduction, Second Edition", May 23, 2005, IBM Press, XP55009093, ISBN: 978-0-32-120019-8 pp. 173-178.
Chinese Office Action in Application 200880115943.1, mailed Oct. 25, 2011, 13 pgs.
European Extended Search Report in EP Application 09739350.8, mailed Nov. 9, 2011, 10 pgs.
U.S. Appl. No. 12/111,174, Office Action mailed Nov. 21, 2011, 20 pgs.
U.S. Appl. No. 11/957,010, Amendment and Response filed Nov. 16, 2011, 12 pgs.
U.S. Appl. No. 12/044,744, Amendment and Response filed Nov. 30, 2011, 12 pgs.
U.S. Appl. No. 12/145,536, Amendment and Response filed Nov. 30, 2011, 20 pgs.
Appleton, Brad, "ClearView: Associating Attributes and Notes With a View", ClearCase International User's Group Conference, Sep. 1996, 16 pgs.
Byfield, Bruce, "Ooo Off the Wall: That's Your Version—Document Control in Ooo Writer", published on Linux Journal, Mar. 7, 2006, 6 pgs.
Immedius, Inc., "S1000Dmanager v 3.0", Comprehensive S1000D Project Setup and Management Support, found online on Aug. 22, 2008 at: http://www.immediuss1000d.com/c_manager/S1Dmanager_overview.html, 6 pgs.
PCT International Search Report for PCT/US2009/062364 dated May 31, 2010, 11 pgs.
Samiei et al., "EzMail: Using Information Vizualization Techniques to Help Manage Email", Proceedings of the 8th National Conference on Information Vizualization, 2004, 6 pgs.
U.S. Appl. No. 11/951,973, Notice of Allowance mailed Jun. 21, 2011, 9 pgs.
U.S. Appl. No. 11/957,010, Office Action mailed Aug. 17, 2011, 26 pgs.
U.S. Appl. No. 12/044,744, Final Office Action mailed Aug. 30, 2011, 17 pgs.
U.S. Appl. No. 12/111,174, Amendment and Response mailed Sep. 8, 2011, 11 pgs.
U.S. Appl. No. 12/117,040, Office Action mailed Oct. 4, 2011, 15 pgs.
U.S. Appl. No. 12/276,874, Amendment and Response filed Jun. 22, 2011, 17 pgs.
U.S. Appl. No. 12/276,874, Final Office Action mailed Aug. 3, 2011, 15 pgs.
U.S. Appl. No. 12/276,874, Office Action mailed Feb. 22, 2011, 15 pgs.
U.S. Appl. No. 12/276,874, Office Action mailed Oct. 26, 2011, 18 pgs.
Venolia, Gina et al., "Understanding Sequence and Reply Relationships Within Email Conversations: A Mixed-Model Vizualization", Apr. 2003, Proceedings of the SIGCHI Conference on Human Factors in Computing Systems, Ft. Lauderdale, FL, USA, Apr. 5-10, 2003, 8 pgs.
Williams, Tim, "Version Control on the Cheap: A User-Friendly, Cost-Effective Revision Control System for SAS", 10 pgs.
Zend Corporation, the PHP Company, "Team Development With Zend Studio for Eclipse", White Paper, Jan. 2008, 17 pgs.
U.S. Appl. No. 13/079,605, Office Action mailed Dec. 5, 2011, 31 pgs.
U.S. Appl. No. 12/044,744, Office Action mailed Dec. 30, 2011, 17 pgs.
U.S. Appl. No. 11/957,010, Office Action mailed Jan. 27, 2012, 25 pgs.
U.S. Appl. No. 12/117,040, Amendment and Response filed Jan. 4, 2012, 12 pgs.
U.S. Appl. No. 12/276,874, Amendment and Response filed Jan. 26, 2012, 13 pgs.
Chinese Office Action in Application 200880119647.9, mailed Nov. 24, 2011, 7 pgs.
Chinese 1st Office Action in Application 200880121295.0, mailed Jan. 18, 2012, 6 pgs.
U.S. Appl. No. 12/111,174, Amendment and Response filed Feb. 21, 2012, 9 pgs.
Chinese Response filed Mar. 23, 2012, in Application No. 200880119647 (24 pgs).
Taiwan Search Report for Taiwan Invention Patent Application No. 097142418, researched on Feb. 14, 2012 (5 pgs).
United States Final Office Action mailed Mar. 12, 2012, in U.S. Appl. No. 12/145,536 (51 pgs).
United States Amendment and Response to Non-Final Office Action mailed Apr. 4, 2011, in U.S. Appl. No. 13/079,605, filed Feb. 28, 2012 (12 pgs).
U.S. Appl. No. 12/117,040, Notice of Allowance mailed Aug. 20, 2012, 14 pgs.
Chinese 1st Office Action in Application 201080019470.2, mailed Aug. 31, 2012, 8 pgs.

(56) References Cited

OTHER PUBLICATIONS

U.S. Appl. No. 12/111,174, Notice of Allowance mailed Aug. 29, 2012, 11 pgs.
U.S. Appl. No. 12/145,536, Amendment and Response filed Sep. 11, 2012, 22 pgs.
Australian Notice of Acceptance in Application 2008324973, mailed Aug. 22, 2012, 3 pgs.
Chinese 3rd Office Action in Application 200880115943.1, mailed Aug. 30, 2012, 6 pgs.
Taiwanese Notice of Allowance on Application 97142418, mailed Aug. 16, 2012, 4 pgs.
Australian Office Action in Application 2008335565, mailed Aug. 30, 2012, 3 pgs.
Chinese 2nd Office Action in Application 200880119647.9, mailed Aug. 13, 2012, 6 pgs.
U.S. Appl. No. 12/044,744, Notice of Allowance mailed Jun. 21, 2012, 8 pgs.
U.S. Appl. No. 13/079,605, Notice of Allowance mailed Jun. 28, 2012, 9 pgs.
U.S. Appl. No. 12/117,040, Notice of Allowance mailed Jun. 21, 2012, 9 pgs.
Murray, Katherine et al., "Compare and Combine Documents in Word 2007", Microsoft Office Word 2007 Inside Out, obtained online on Jul. 11, 2012 at: http://office.microsoft.com/en-us/word-help/compare-and-combine-documents-in-word-2..., 2012 Microsoft Corporation, 5 pgs.
U.S. Appl. No. 12/276,874, Office Action mailed Apr. 26, 2012, 20 pgs.
U.S. Appl. No. 12/044,744, Notice of Allowance mailed May 7, 2012, 12 pgs.
"Perforce software Delivers Improved Performance to its Fast Software Configuration Management System," Perforce Software, Jul. 9, 2007, 2 pages.
"Technical Overview," Apache CouchDB, The Apache Software Foundation, © 2008, 7 pages.
Badouel, Eric et al., "Merging Hierarchially-Structured Documents in Workflow Systems", Electronic Notes in Theoretical Computer Science 203, (2008), 3-24.
Chinese 1st Office Action in Application 200980115758.7, mailed Mar. 28, 2012, 10 pgs.
Dekeyser, Stijin, et al., "Path Locks for XML Document Collaboration", University of Antwerp, Dec. 12, 2002, pp. 105-114.
Ellis et al., "Groupware—Some Issues and Experiences", vol. 34, No. 1, Jan. 1, 1991, pp. 38-58.
European Extended Search Report in EP Application 09767155.6, mailed Mar. 26, 2012, 10 pgs.
Feise, Joachim; "A Survey of Distributed Hypermedia Systems," ISR Institute for Software Research, University of California, Irvine, Apr. 2005, 39 pages.
Mendoza et al., "A Flexible Distribution Service for a Co-authoring Environment on the Web," IEEE Computer Society, Proceedings of Sixth Mexican International Conference on Computer Science (ENC '05) © 2005, 8 pages.
PCT International Search Report and Written Opinion in Application PCT/US2010/032309, mailed Dec. 1, 2010, 9 pgs.
Shepler et al., "Network File 1-15 Systems (NFS)," Version 4, Apr. 1, 2003, retrieved from http://rsync.tools.ietf.org/html/rfc3530 on Mar. 7, 2012, 275 pgs.
Shiro Sakata, "Development and Evaluation on an in-house multimedia desktop conference system", Apr. 1990, IEEE Journal on selected areas in communications, vol. 8.
Tanebaum, Andrew S., "Moderne Betriebssysteme", 2003 Pearson, pp. 786-787.
U.S. Appl. No. 11/957,010, Amendment and Response filed Apr. 9, 2012, 12 pgs.
U.S. Appl. No. 12/111,174, Notice of Allowance mailed Apr. 12, 2012, 11 pgs.
U.S. Appl. No. 12/117,040, Notice of Allowance mailed Mar. 29, 2012, 11 pgs.
U.S. Appl. No. 12/432,817, Amendment and Response filed Dec. 12, 2011, 15 pgs.
U.S. Appl. No. 12/432,817, Amendment and Response filed Apr. 25, 2012, 11 pgs.
U.S. Appl. No. 12/432,817, Office Action mailed Jan. 25, 2012, 27 pgs.
U.S. Appl. No. 12/432,817, Office Action mailed May 2, 2012, 6 pgs.
U.S. Appl. No. 12/432,817, Office Action mailed Sep. 12, 2011, 25 pgs.
U.S. Appl. No. 13/079,605, Notice of Allowance mailed Apr. 20, 2012, 9 pgs.
U.S. Appl. No. 12/044,744, Amendment and Response filed Mar. 30, 2012, 11 pgs.
U.S. Appl. No. 12/432,817, Notice of Allowance mailed Aug. 6, 2012, 5 pgs.
Chinese 2nd Office Action in Application 200880115943.1, mailed Jun. 1, 2012, 7 pgs.
Russian Notice of Allowance in Application 2010123793, mailed Apr. 13, 2012, 7 pgs.
Australian Office Action in Application 2008324973, mailed Jul. 4, 2012, 3 pgs.
Grover, Chris, "Word 2007: The Missing Manual", Pogue Press, Copyright, pp. 380-388.
Tyson, Herb, "Microsoft Word 2007 Bible", Wiley Publishing Company, Inc. 2007, Indianapolis, IN, USA, pp. 807-808.
"How to Track and Manage Changes in a Word 2002 and a Word 2003 Document," Microsoft Corporation, Mar. 8, 2007, 4 pages.
"Track Changes in Word 2007 Tutorial," Florida Gulf Coast University, copyright 2007, 2 pages.
Jalbert, Peter, "Real Time Collaboration with Google Docs and Spreadsheets," Jan. 23, 2008, 5 pages.
Willden, Andrew, "Track Changes in Word 2007," Fall 2007, 2 pages.
U.S. Appl. No. 12/111,174, Notice of Allowance mailed Nov. 19, 2012, 2 pgs.
U.S. Appl. No. 13/079,605, Notice of Allowance mailed Nov. 19, 2012, 2 pgs.
U.S. Appl. No. 13/495,659, Office Action mailed Nov. 21, 2012, 7 pgs.
U.S. Appl. No. 12/117,040, Notice of Allowance mailed Dec. 6, 2012, 14 pgs.
U.S. Appl. No. 13/079,605, Notice of Allowance mailed Dec. 5, 2012, 2 pgs.
U.S. Appl. No. 12/111,174, Notice of Allowance mailed Dec. 4, 2012, 2 pgs.
U.S. Appl. No. 12/145,536, Notice of Allowance mailed Nov. 23, 2012, 18 pgs.
Russian Notice of Allowance in Application 2010122968, mailed Nov. 6, 2012, 27 pgs.
Australian Office Action in Application 2008338826, mailed Oct. 24, 2012, 3 pgs.
Chinese 2nd Office Action in Application 200980115758.7, mailed Dec. 5, 2012, 7 pgs.
Chinese 1st Office Action in Application 200980147769.3, mailed Nov. 29, 2012, 12 pgs.
U.S. Appl. No. 13/539,473, Amendment and Response filed Jan. 11, 2013, 15 pgs.
U.S. Appl. No. 12/276,874, Amendment and Response filed Dec. 27, 2012, 14 pgs.
Australian Notice of Allowance in Application 2008338826, mailed Dec. 5, 2012, 2 pgs.
U.S. Appl. No. 13/539,473, Office Action mailed Apr. 2, 2013, 26 pgs.
U.S. Appl. No. 13/495,659, Amendment and Response filed Mar. 21, 2013, 8 pgs.
U.S. Appl. No. 12/276,874, Office Action mailed Mar. 28, 2013, 24 pgs.
Chinese Notice of Allowance in Application 200880119647.9, mailed Feb. 28, 2013, 4 pgs.
Japanese Notice of Rejection in Application 2010-536967, mailed Feb. 8, 2013, 6 pgs.
Chinese 3rd Office Action in Application 200880121295.0, mailed Apr. 9, 2013, 9 pgs.

(56) References Cited

OTHER PUBLICATIONS

Japanese Notice of Allowance in Application 2010-538018, mailed Mar. 15, 2013, 6 pgs.
Russian Notice of Allowance in Application 2010144042, mailed Feb. 27, 2013, 7 pgs.
Lloyd, Zach et al., "Collaboration Goes One Level Deeper", obtained online at: http://googledocs.blogspot.in/2008/03/collaboration-goes-one-level-deeper.html, published Mar. 19, 2008, 2 pgs.
"Emerging from a Highly Praised Private Beta, Zoho Notebook is a One-Stop Destination for Accessing and Sharing Content-Creation, Aggregation and Collaboration", obtained online at: http://www.zoho.com/news/zoho_notebook_public_beta.html, published May 22, 2007, 3 pgs.
"Apple Introduces iWork'08", obtained online at: http://www.apple.com/pr/library/2007/08/07Apple-Introduces-iWork-08.html, published Aug. 7, 2007, 2 pgs.
Russian Notice of Allowance in Application 2010153320, mailed Apr. 17, 2013, 23 pgs.
Chinese 2nd Office Action in Application 200980147769.3, mailed Jun. 7, 2013, 10 pgs.
Chinese 3rd Office Action in Application 201080019470.2, mailed May 31, 2013, 6 pgs.
Chinese Notice of Allowance in Application 200980115758.7, mailed Jun. 6, 2013, 4 pgs.
Japanese Notice of Rejection in Application 2011-507506, mailed May 21, 2013, 6 pgs.
Chinese 2nd Office Action in Application 200980116872.1, mailed Jun. 18, 2013, 6 pgs.
Japanese Notice of Rejection in Application 2011508530, mailed Jun. 18, 2013, 6 pgs.
Chinese 2nd Office Action in Application 200980124935.8, mailed Jun. 19, 2013, 7 pgs.
Taiwanese Office Action and Search Report in Application 099108780, mailed Jun. 19, 2013, 5 pgs.
U.S. Appl. No. 12/276,874, Office Action mailed Sep. 27, 2012, 22 pgs.
Chinese 2nd Office Action in Application 200880121295.0, mailed Oct. 23, 2012, 10 pgs.
Chinese 1st Office Action in Application 200980116872.1, mailed Oct. 9, 2012, 14 pgs.
Australian Notice of Allowance in Application 2008335565, mailed Sep. 18, 2012, 3 pgs.
Chinese 1st Office Action in Application 200980124935.8, mailed Oct. 30, 2012, 10 pgs.
European Examination Report in Application 09739350.8, mailed Sep. 25, 2012, 7 pgs.
Tanenbaum, Andrew S., "Modern Operating Systems", 2nd Edition, Prentice Hall, New Jersey, pp. 735-737.
U.S. Appl. No. 13/079,605, Notice of Allowance mailed Oct. 22, 2012, 9 pgs.
U.S. Appl. No. 13/539,473, Office Action mailed Oct. 11, 2012, 23 pgs.
Japanese Notice of Rejection mailed Dec. 28, 2012, in Application No. 2010-533160, 8 pages.
Chinese Notice on the Second Office Action mailed Mar. 1, 2013, in Application No. 201080019470.2, 6 pages.
Chinese Notice of Allowance in Application 200880115943.1, mailed Jan. 15, 2013, 4 pgs.
U.S. Appl. No. 13/495,659, Office Action mailed Jul. 5, 2013, 8 pgs.
U.S. Appl. No. 12/276,874, Amendment and Response filed Jun. 26, 2013, 13 pgs.
Japanese Notice of Rejection in Application 2012-508556, mailed Oct. 21, 2013, 7 pgs.
Taiwan Notice of Allowance in Application 99108780, mailed Oct. 21, 2013, 4 pgs.
U.S. Appl. No. 13/539,473, Office Action mailed Oct. 25, 2013, 17 pgs.
U.S. Appl. No. 13/495,659, Office Action mailed Oct. 25, 2013, 8 pgs.
European Oral Hearing Summons in Application 09739350.8, mailed Jun. 27, 2013, 6 pgs.
Japanese Notice of Rejection in Application 2011516385, mailed Jul. 9, 2013, 6 pgs.
Japanese Notice of Rejection in Application 2010-533160, mailed Aug. 20, 2013, 4 pgs.
Russian Notice of Allowance in Application 2010118615, mailed Jul. 1, 2013, 6 pgs.
Russian Notice of Allowance in Application 2010145165, mailed Jun. 20, 2013, 6 pgs.
U.S. Appl. No. 11/957,010, Office Action mailed Aug. 12, 2013, 28 pgs.
U.S. Appl. No. 13/539,473, Amendment and Response filed Sep. 3, 2013, 13 pgs.
U.S. Appl. No. 12/276,874, Office Action mailed Sep. 10, 2013, 24 pgs.
U.S. Appl. No. 13/495,659, Amendment and Response filed Oct. 2, 2013, 9 pgs.
Chinese Notice of Allowance in Application 201080019470.2, mailed Aug. 7, 2013, 4 pgs.
Japanese Final Rejection in Application 2010-536967, mailed Oct. 9, 2013, 6 pgs.
Chinese Decision on Rejection in Application 200980147769.3, mailed Nov. 7, 2013, 9 pgs.
Chinese Notice of Allowance in Application 2008801212195.0, mailed Sep. 5, 2013, 4 pgs.
Chinese Notice of Allowance in Application 200980116872.1, mailed Dec. 26, 2013, 4 pgs.
Chinese Notice of Allowance in Application 200980124935.8, mailed Nov. 11, 2013, 4 pgs.
U.S. Appl. No. 11/957,010, Amendment and Response filed Jan. 13, 2014, 18 pgs.
U.S. Appl. No. 13/495,659, Amendment and Response filed Jan. 27, 2014, 8 pgs.
European Decision To Refuse and a Copy of the Minutes of the Oral Hearing in EP Application 09739350.8, mailed Dec. 4, 2013, 36 pgs.
Japanese Notice of Allowance in Application 2011-507506, mailed Nov. 20, 2013, 4 pgs.
Japanese Notice of Allowance in Application 2011-508530, mailed Jan. 29, 2014, 4 pgs.
Japanese Notice of Allowance in Application 2010536967, mailed Mar. 5, 2014, 4 pgs.
Australian First Office Action in Application 2009241535, mailed Mar. 13, 2014, 4 pgs.
Australian First Office Action in Application 2009262859, mailed Mar. 7, 2014, 3 pgs.
Australian First Office Action in Application 2009318022, mailed Mar. 11, 2014, 3 pgs.
U.S. Appl. No. 11/957,010, Notice of Allowance mailed Mar. 12, 2014, 9 pgs.
U.S. Appl. No. 12/276,874, Amendment and Response filed Feb. 10, 2014, 14 pgs.
Japanese Notice of Allowance in Application 2010-533160, mailed Jan. 14, 2014, 4 pgs.
European Notice of Appeal in Application 09739350.8, filed Feb. 14, 2014, 2 pgs.
Taiwanese Search Report in Application 097144208, mailed Feb. 8, 2014, 13 pgs.
European Submission of Grounds of Appeal in Application 09739350.8, filed Apr. 14, 2014, 4 pgs.
Taiwanese Search Report in Application 098117528, mailed Mar. 20, 2014, 10 pgs.
Australian Office Action in Application 2010241814, mailed Apr. 11, 2014, 4 pgs.
U.S. Appl. No. 13/539,473, Amendment and Response filed Apr. 25, 2014, 15 pgs.
U.S. Appl. No. 12/276,874, Office Action mailed May 30, 2014, 25 pgs.
Taiwanese Search Report in Application 097139413, mailed Mar. 17, 2014, 13 pgs.

(56) References Cited

OTHER PUBLICATIONS

Australian Notice of Acceptance in Application 2009262859, mailed May 1, 2014, 2 pgs.
Japanese Final Rejection in Application 2012-508556, mailed May 7, 2014, 6 pgs.
Russian Notice of Allowance in Application 2011143794, mailed Apr. 11, 2014, 21 pgs.
U.S. Appl. No. 11/957,010, Notice of Allowance mailed Jun. 10, 2014, 6 pgs.
U.S. Appl. No. 13/760,224, Office Action mailed Jun. 6, 2014, 14 pgs.
U.S. Appl. No. 13/539,473, Notice of Allowance mailed Jul. 9, 2014, 9 pgs.
U.S. Appl. No. 13/495,659, Office Action mailed Jul. 9, 2014, 8 pgs.
Australian Notice of Allowance in Application 2010241814, mailed May 21, 2014, 2 pgs.
Taiwanese Notice of Allowanec in Application 097139413, mailed Jun. 27, 2014, 4 pgs.

\* cited by examiner

CACHING INFRASTRUCTURE

BACKGROUND

In a collaborative environment, some computer applications allow multiple clients to simultaneously edit a document. As multiple clients are editing the document, a server may maintain a copy of the document. The server may need to continually update the copy of the document to reflect the current state of the document. This can lead to inefficiencies.

For example, even with only a single client editing the document, the client's application may need to continuously update the server to allow the transition to multi-party editing when it occurs. This can increase server load, thereby causing a degradation in performance.

SUMMARY

Example systems and methods described herein relate to a caching infrastructure.

According to one aspect, an example method for retrieval of presence metadata includes: receiving a request from a first client to edit a document file; sending short-term check out metadata to the first client to begin an editing session; and writing the transition ID to a transition table stored in a cache, wherein the presence of another transition ID in the cache indicates that a document has switched from a single-client mode to a multi-client mode.

According to another aspect, an example system includes a cache infrastructure for retrieval of presence metadata. The system includes a memory storage unit, and a processing unit coupled to the memory storage unit, wherein the processing unit is operative to receive short-term check out metadata from a first client to begin an editing session, add a transition ID to the short-term check out metadata, write the transition ID to a transition table stored in a cache, and switch from a single-client mode to a multi-client mode. Switching from the single-client mode to the multi-client mode comprises the processing unit being operative to notice when the first client attempts to take another short-term lock on the document and seeing that that a second client has already received the document. The processing unit is operative to determine if the multi-client mode is in progress by checking a database, receive a ping from the first client to determine if the transition ID is in the cache, and when the transition ID is not in the cache, receive pings from the first client at regular intervals, and save the document to the server a plurality of times without incurring any reads/writes to the database, and, when the transition ID is in the cache, receive a ping from the first client to collect a lock table from the database to identify the second client, and receive the second client's lock information by receiving pings that do not carry lock information.

According to yet another aspect, an example client computer for retrieval of metadata relating to a multi-client editing session includes a memory unit, and a processing unit operative to receive a document from a storage device, the document comprising short-term check out metadata indicating an editing session has begun, ping a cache to determine if another transition ID is stored in the cache, and send a transition ID to a transition table stored in a cache when the another transition ID is not stored in the cache to switch from a single-client mode to a multi-client mode when the another transition ID is stored in the cache.

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

In the following detailed description, references are made to the accompanying drawings that form a part hereof, and in which are shown by way of illustrations specific embodiments or examples. While the disclosure will be described in the general context of program modules that execute in conjunction with an application program that runs on an operating system on a computer system, those skilled in the art will recognize that the disclosure also may be implemented in combination with other program modules. The embodiments described herein may be combined and other embodiments may be utilized without departing from the spirit or scope of the present disclosure. The following detailed description is therefore not to be taken in a limiting sense, and the scope of the disclosure is defined by the appended claims and their equivalents.

Embodiments of the present disclosure provide an environment in which multiple clients can collaboratively author a document while consuming minimal server resources. In example embodiments, when a coauthoring capable application is editing a document, the application adds coauthoring metadata to the document and keeps a server copy of the file updated with the latest metadata. The coauthoring metadata and server copy allows seamlessly transitions from a single client to a multi-client editing state and vice versa. To keep conflicts to a minimum, the coauthoring metadata is uploaded to the server. When a new client opens the document, the client is notified of the areas of the document where other clients are working.

Figure 1:
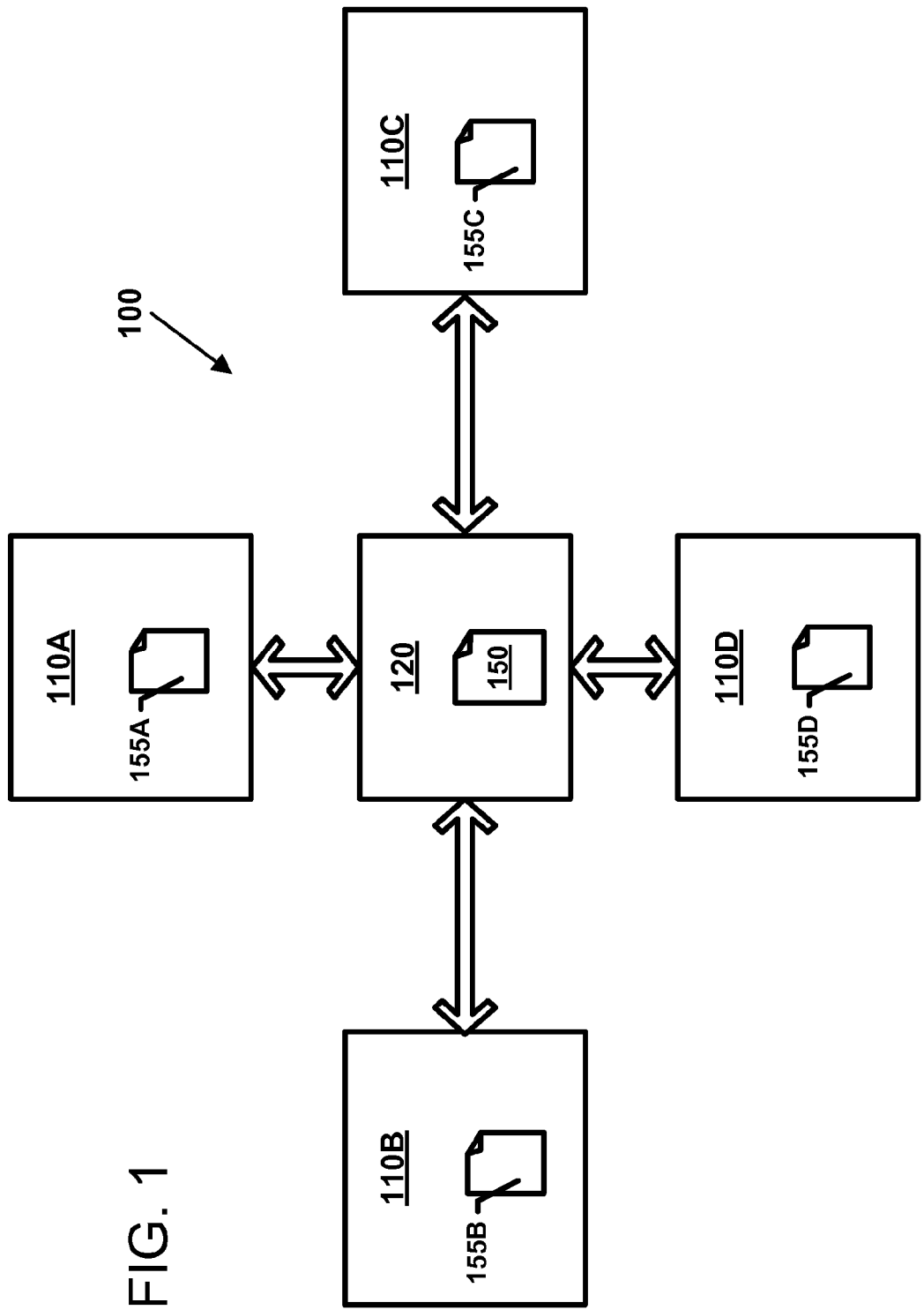
FIG. 1 is a schematic block diagram illustrating an example authoring system.

FIG. 1 illustrates an example authoring system 100 having features that illustrate examples aspects of the disclosure. The authoring system 100 includes a storage device 120 storing a master copy of a document 150. In one embodiment, the storage device 120 may include, but not limited to, a server, a client computer, or other computing device. In another embodiment, the storage device 120 can include one or more storage devices (e.g., a network of computing devices).

The authoring system 100 also includes at least one client computing device 110 that is communicatively coupled to the storage device 120. Each of the client computing devices 110 can edit the document 150 by creating a client copy 155 of the document 150 and editing the client copy 155. The client copies 155 of the document 150 are synchronized when the client computing devices 110 periodically send to the storage device 120 updates to be shared with the other client computing devices and periodically obtain from the storage device 120 updates from other client computing devices.

As the term is used herein, a client computing device 110 includes any computing device that obtains a client copy of a document to be authored from a master copy of the document. The client computing device 110 can be different from the storage device 120 or can include a different client account implemented on the storage device 120. In one embodiment, a computing device that acts as a storage device 120 for one document may act as a client computing device 110 for a different document and vice versa.

In the example shown, four client computing devices 110A, 110B, 110C, and 110D are communicatively coupled to the storage device 120. In other embodiments, however, any number of computing devices 110 may be coupled to the storage device 120. In the example shown, each client computing device 110A, 110B, 110C, 110D can send to the storage device 120 updates generated by the client of the client computing device and can request from the storage device 120 updates generated by the clients of the other client computing devices. In one embodiment, the storage device 120 can be a server computing device and the client computing devices 110A, 110B, 110C, 110D can be client computing devices. Other system configurations are possible. For example, in an alternative embodiment, multiple server computing devices can be used.

Figure 2:
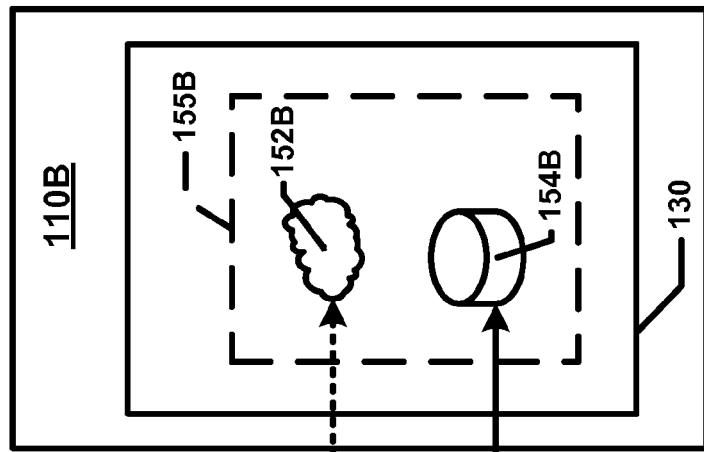
FIG. 2 is a schematic block diagram illustrating the authoring system of FIG. 1 in which a document stored on first computing device can include content and metadata.
Figure 2:
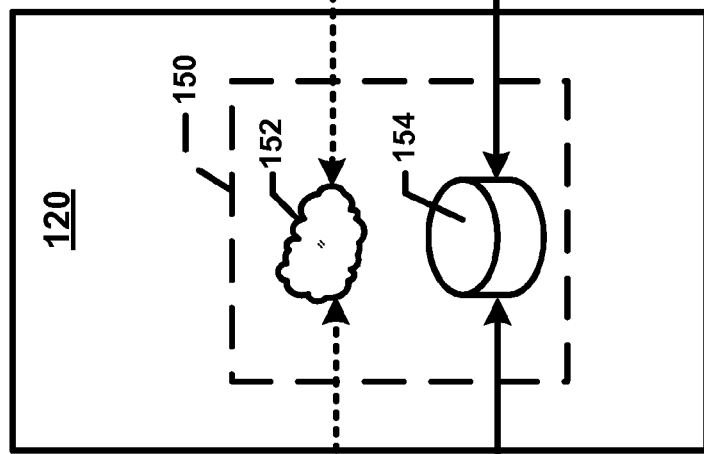
Figure 2:
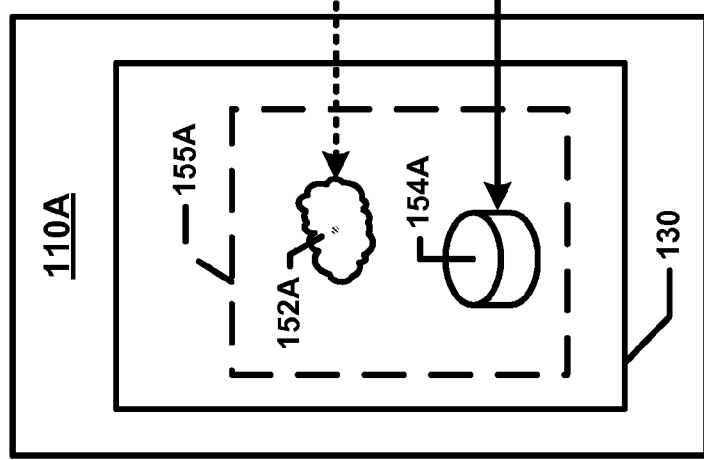

As shown in FIG. 2, the document 150 stored on the storage device 120 can include content 152 and metadata 154. Authoring applications 130 on the client computing devices 110 process and manipulate the content and metadata of the client copies 155 of the document 150. In some embodiments, metadata 154 can be stored separately from content 152. For example, content 152 can be stored in the document 150 and metadata 154 can be stored in a table (see FIG. 3) separate from the document 150. In other embodiments, however, the metadata 154 can be stored within the document 150.

In general, the client computing devices 110 can synchronize updates to the content 152 separately from updates to the metadata 154. In general, metadata updates 154 are automatically synchronized among the storage device 120 and client computing devices 110, whereas content updates 152 from each client computing device 110 are synchronized at the request of the respective client.

Figure 3:
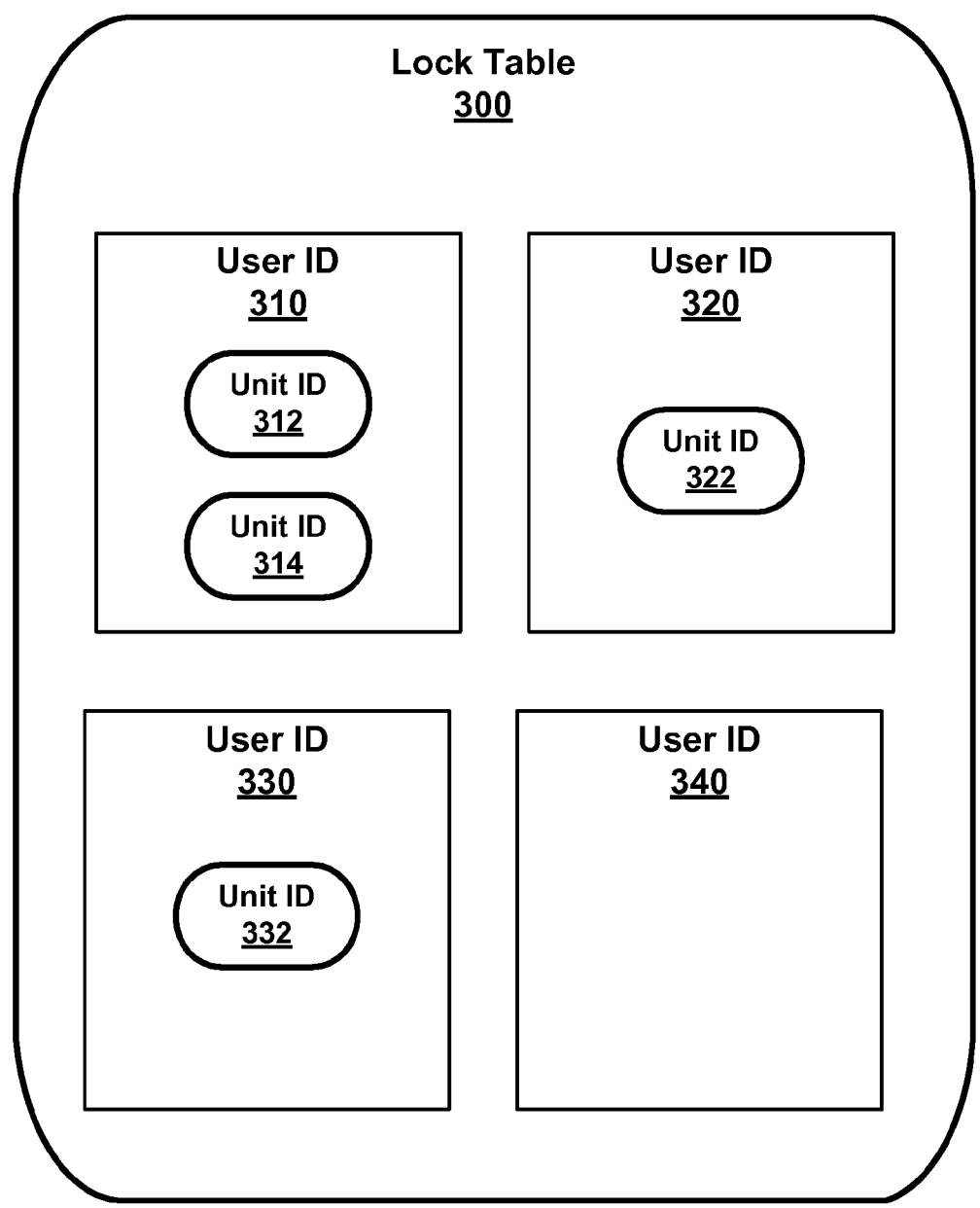
FIG. 3 is a schematic block diagram of an example lock table.

Referring to FIG. 3, lock metadata can be stored in a variety of different formats. For example, the lock metadata of FIG. 3 is stored in a table format 300. The lock table 300 of FIG. 3 includes a list of clients, each of whom is identified with a client identifier (e.g., an identification number) that is uniquely assigned to the client. Data units to be locked are identified with unit identifiers (e.g., identification numbers) that are uniquely assigned to each data unit within a document. The lock table 300 associates the unit identifiers of the one or more data units to be locked with the client identifiers of the clients who own the locks.

For example, in the lock table 300, data units 312 and 314 are associated with a first client 310. Other clients, therefore, are inhibited from editing data units 312 and 314. Data unit 322 is associated with client 320. Other clients, including the first client 310, therefore, are inhibited from editing data unit 322. The fourth client 340 has not locked any portion of the document and so is not associated with any unit identifiers. In other embodiments, however, lock metadata can be stored in a different format or within the document. For example, the lock table 300 can be arranged by unit identifier instead of by client identifier.

Presence metadata also can be stored in a variety of formats. For example, presence metadata can be stored in the lock table 300 of FIG. 3. In another embodiment, however, presence metadata can be stored in a separate table or in a different format. Presence metadata includes the client identifier of each client that is currently accessing the document or that has staked a claim (e.g., generated a content lock) on a data unit of the document. For example, a metadata table, such as the lock table 300, can store the client identifier of each client having a claim to at least one data unit of the document. Like lock metadata, presence metadata can be synchronized automatically.

Figure 4:
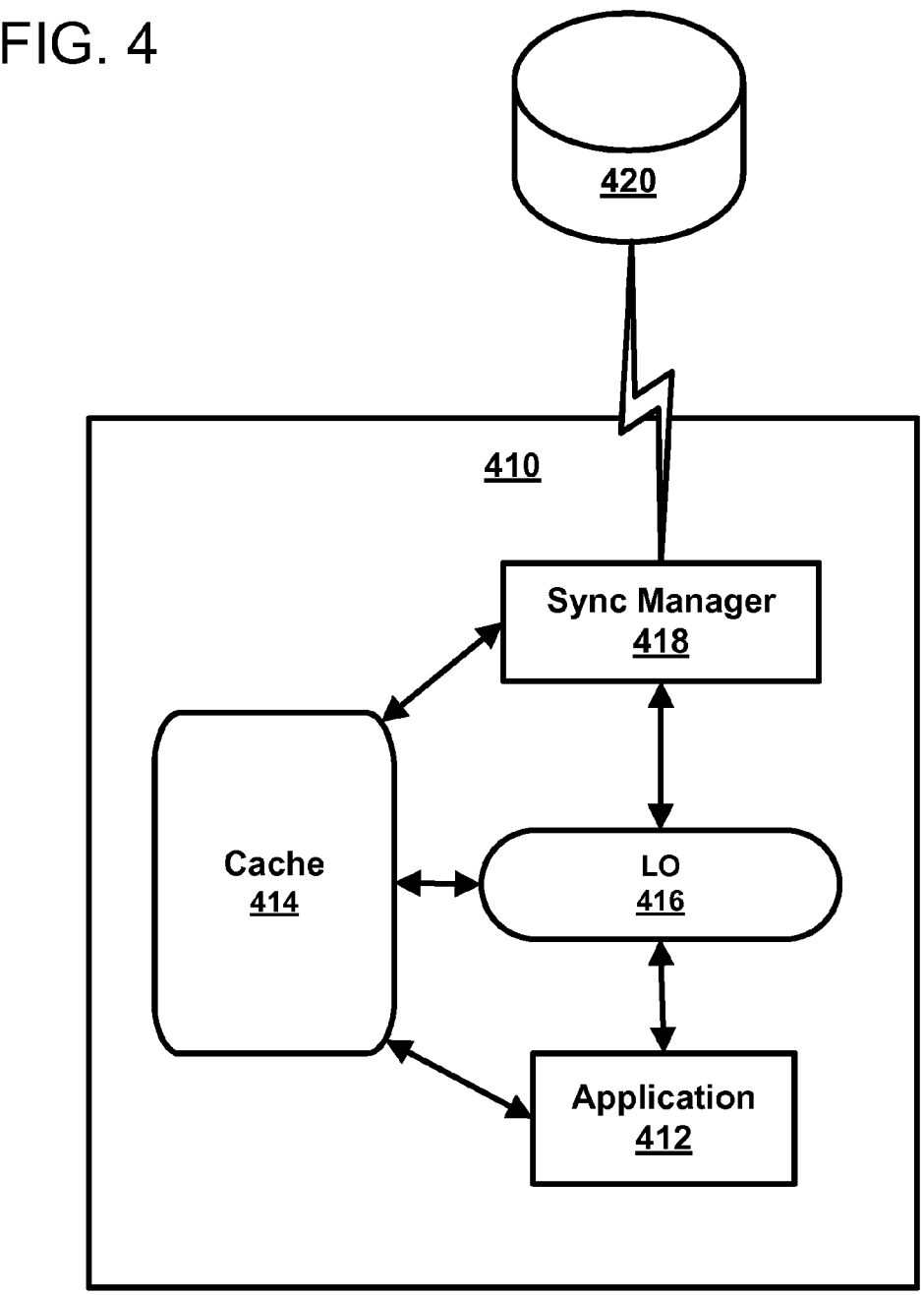
FIG. 4 is a schematic block diagram of an example authoring environment including a first computing device on which a master copy of a document to be authored is to be stored.
Figure 5:
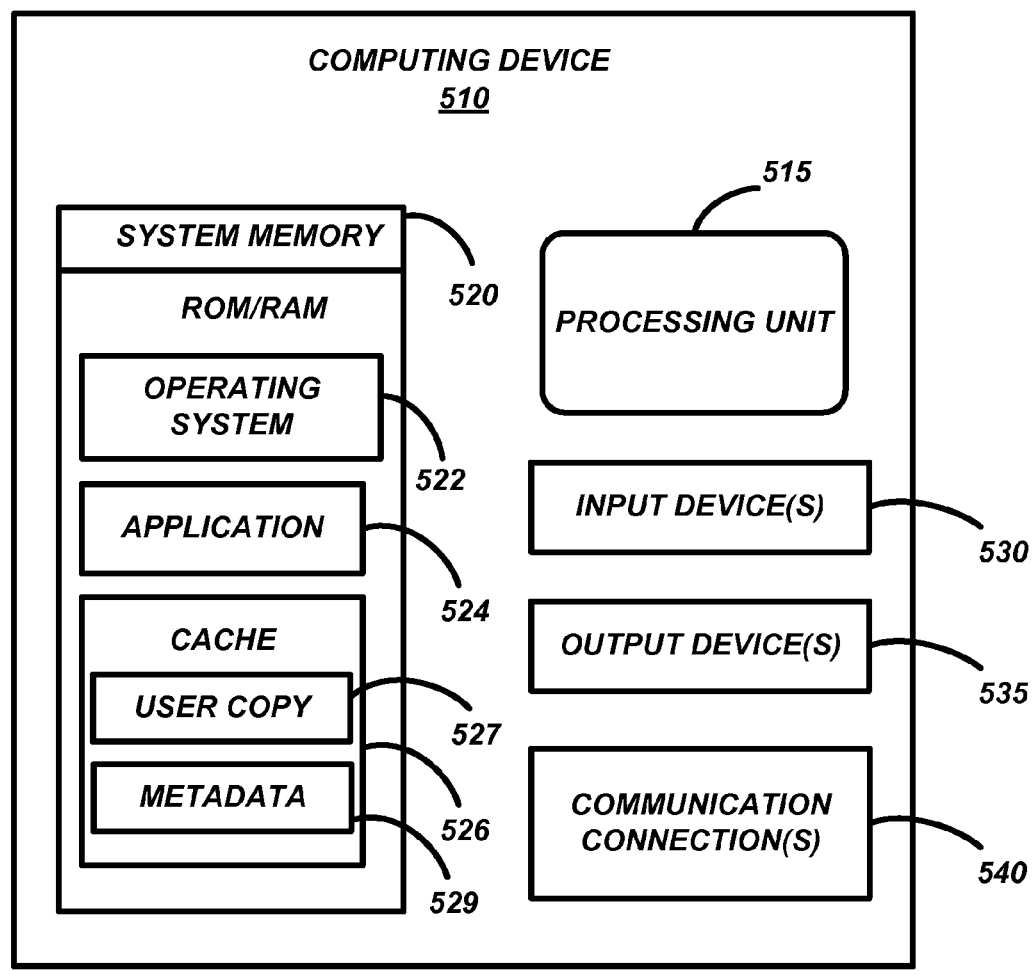
FIG. 5 is a schematic block diagram of an example client computing system configured to implement an authoring environment.

FIGS. 4 and 5 provide greater detail in how coauthoring between the client copy and the master copy of the document is implemented by a client computing device. FIG. 4 is a schematic block diagram of an authoring system 400 including a storage device 420 on which a master copy of a document to be authored is to be stored. The authoring system 400 also includes at least one client computing device 410 communicatively coupled to the storage device 420.

The client computing device 410 includes an authoring application 412 configured to provide an authoring environment in which a client can create and/or manipulate a document to be authored. The client computing device 410 also includes a cache 414, a layer object ("LO") 416, and a synchronization manager ("sync manager") 418. The cache 414 stores a client copy of the document to be authored. The cache 414 also stores the metadata, including lock and presence metadata, associated with the document. Updates to the content and metadata of the document also can be stored in the cache 414.

The layer object 416 provides an interface between the authoring application 412 and the cache 414. The layer object 416 also provides an interface between the authoring application 412 and the sync manager 418. The sync manager 418 communicates with the storage device 420 and provides an interface between the storage device 420 and the cache 414. For example, the sync manager 418 can send updates to and obtain updates from the storage device 420 and the cache 414.

In general, an authoring environment having features that are examples of aspects in accordance with the principles of the disclosure can be implemented on a client computing device (e.g., a personal computer, a server computer, a notebook computer, a PDA, a Smartphone, or any other such computing device). A non-limiting embodiment of a client computing system 500 configured to implement an authoring environment is described herein with reference to FIG. 5.

In FIG. 5, the exemplary computing system 500 for implementing the principles of the disclosure includes a client computing device, such as client computing device 510. In a basic configuration, the client computing device 510 typically includes at least one processing unit 515 for executing applications and programs stored in system memory 520. Depending on the exact configuration and type of computing device 510, the system memory 520 may include, but is not limited to, RAM, ROM, EEPROM, flash memory, CD-ROM, digital versatile disks (DVD) or other optical storage devices, magnetic cassettes, magnetic tape, magnetic disk storage or other magnetic storage devices, or other memory technology.

System memory 520 typically stores an operating system 522, such as the WINDOWS® operating systems from Microsoft Corporation of Redmond, Washington, suitable for controlling the operation of the computing device 510. System memory 520 also may include a document cache 526 in which a client copy 527 of a document can be stored. Metadata 529 of the document also can be stored within the client cache 526.

The system memory 520 also may store one or more software applications, such as authoring applications 524 for creating and editing documents. One non-limiting example of an authoring application 524 suitable for authoring documents in accordance with the principles of the present disclosure is Word word processing software from Microsoft Corporation. Other non-limiting examples of authoring applications include POWERPOINT® presentation software and VISIO® drawing and diagraming software, both also from Microsoft Corporation. Other software applications can also be used.

Computing device 510 also may have input device(s) 530, such as a keyboard, mouse, pen, voice input device, touch input device, etc., for entering and manipulating data. Output device(s) 535, such as a display screen, speakers, printer, etc., also may be included. These output devices 535 are well known in the art and need not be discussed at length herein.

The computing device 510 also may contain communication connections 540 that allow the device 510 to communicate with other computing devices, for example, the storage device 420 of FIG. 4, over a network in a distributed computing environment (e.g., an intranet or the Internet). By way of example, and not limitation, communication device media 540 includes wired media such as a wired network or direct-wired connection, and wireless media, such as acoustic, RF, infrared and other wireless media.

Figure 6:
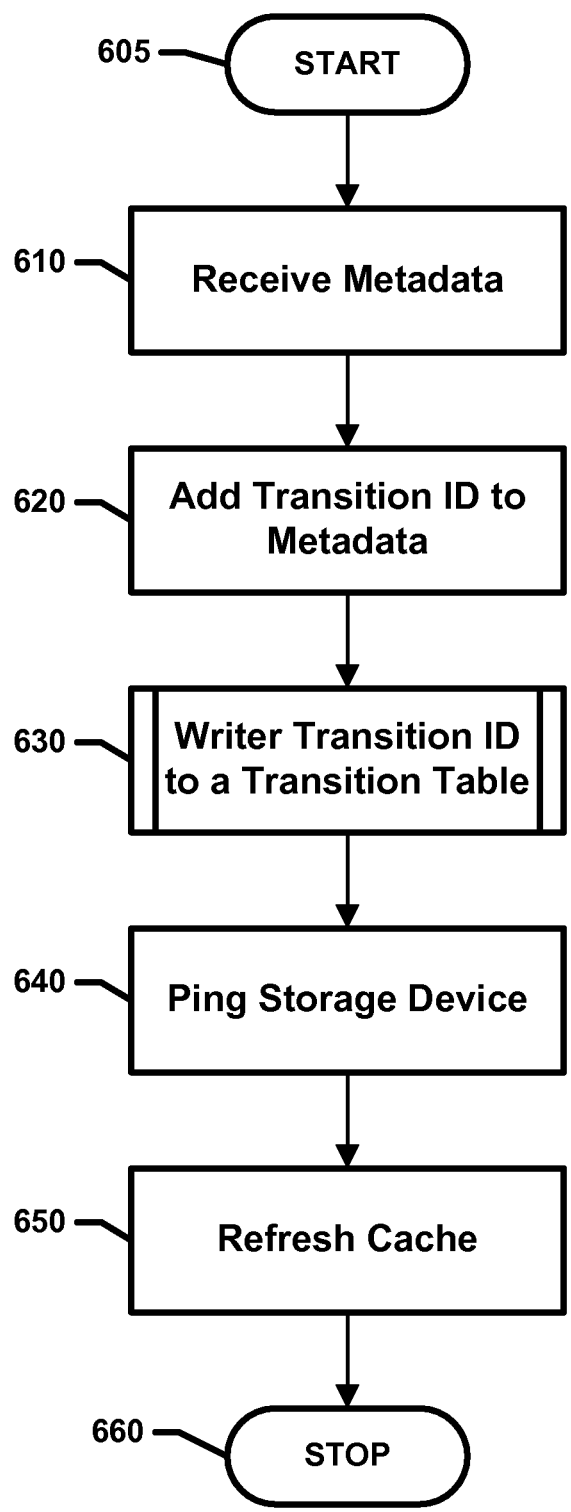
FIG. 6 is a flowchart illustrating an example caching process implemented by an authoring application to recognizes a single or multiple clients editing a document.

Turning now to FIG. 6 is a flow chart setting forth the general stages involved in a method 600 consistent with an embodiment of the disclosure for retrieving presence metadata. Method 600 may be implemented using a computing device 510 as described in above with respect to FIG. 5. Ways to implement the stages of method 600 will be described in greater detail below. Method 600 may begin at starting block 605 and proceed to stage 610 where computing device 510 may receive metadata 529. For example, a client using computing device 510 (e.g. a client computer) may open a document (e.g. 150). Opening the document may cause computing device 510 to receive short-term check out metadata for the document.

From stage 610, where computing device 510 received metadata 529, method 600 may advance to stage 620 where computing device 510 may add a transition ID to the metadata 529.

Once computing device 510 adds the transition ID to metadata 529 in stage 620, method 600 may continue to subroutine 630 where computing device 510 may write the transition ID to a transition table stored in cache 526. For example, writing the transition ID to metadata 529 may indicate more than one client is editing the document (i.e. switching from a single-client mode to a multi-client mode) as show in FIG. 7.

In one example, the transition ID is a unique number, such as a Globally Unique Identifier (GUID—i.e., a pseudo-random dom 128—bit number). The transition table is a list of the transition IDs. The transition table can also include an expiration date for each transition ID. The expiration date can be used to clear a transition ID when a client forces creation of a transition ID and thereupon abandon editing of the document without notification. Other configurations are possible.

From subroutine stage 630, where computing device 510 may write the transition ID to a transition table stored in cache 526, method 600 may advance to stage 640 where computing device 510 may ping storage device 120 (e.g. a server) to determine if the transition ID is in cache 526.

When the transition ID is not in the cache, computing device 510 may ping the server at regular intervals, and save the document to the server a plurality of times without incurring any reads/writes to a database that stores presence information.

When the transition ID is in the cache, computing device 510 may ping the server to collect a lock table from a database to identify a new client, and in a separate web service request, submitting the client's lock information. Computing device 510 may then delete the transition ID from the transition table.

Computing device 510 may also submit a client's lock information. Submitting the client's lock information may include pinging the server. For example, the computing device can submit "am I alone" pings to the server, wherein the "am I alone" pings do not carry lock information. An "am I alone" ping is simply a ping to the server or other storage device wherein computing device 510 is requesting information to determine if the document is being edit by another client or if another client had begun editing the document after the client began editing the document.

Every time each client downloads presence metadata, the number of clients in an editing session and the last time each client updated their presence information (e.g., transition ID, transition table, database, etc.) may be checked (among other things), at regular intervals. If the presence information has not been updated by any client in a configurable window of time, it is considered a violent exit from the session. Any client who first observes this exit can delete the client from the presence information. Further, the delete operation should be a graceful merge so that any other client who also made the same observation can re-request the omissions which results in a no-op in the server.

If the presence information reflects only one client (which should be the examining client, i.e., computing device 510), the following actions may be done to minimize problems associated with the timing of the change of state of the document: 1) clear-up the presence table so it reflects the state as a single client mode; 2) delete the transition ID to the transition table; and 3) start the "am I alone" pings at regular intervals.

The transition ID in the transition table indicates another user has joined the coauthoring session and is in transition back to multi-user authoring. When the system transitions back to one client editing, that client starts sending the "am I alone" pings. The "am I alone" pings returned to the client indicate the client is alone until another client puts the transition ID back in the transition table.

Once computing device 510 pings storage device 120 in stage 640, method 600 may continue to stage 650 where computing device 510 may refresh cache 526.

For example, computing device 510 may refresh cache 526 by updating the transition table stored in cache 526. For instance updating the transition table may include pinging cache 526 to check for the presence of the transition ID in cache 526. When the transition ID is not present in cache 526, a determination may be made to see if cache 526 has been refreshed within a predetermined time interval. When cache 526 has been refreshed within the predetermined time interval, a response to the ping may be sent from cache 526. When cache 526 has not been refreshed within the predetermined time interval, the transition table corresponding to the document's content database may be fetched. Once computing device 510 has refresh cache 526 in stage 650, method 600 may then end at stage 660.

Figure 7:
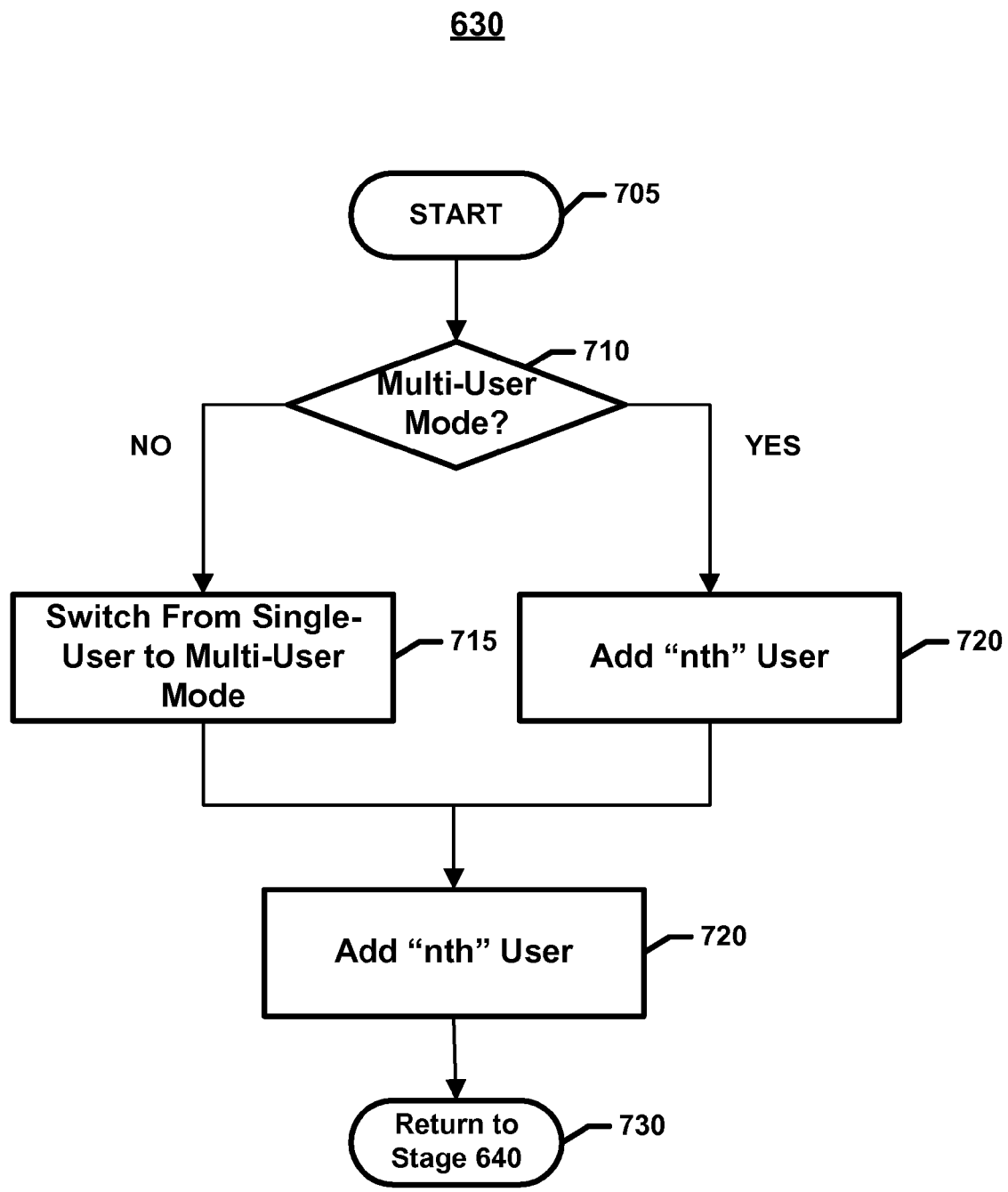
FIG. 7 is a flowchart of an example subroutine used in the method of FIG. 6 for writing a transition ID to a transition table.

FIG. 7 is a flow chart showing example stages of subroutine 630. Subroutine 630 begins at starting block 705 and proceeds to stage 710 where computing device 510 may determine if the document is already being used in the multi-client mode. For example, computing device 510 may determine if the document is in multi-client mode by checking a database. If computing device 510 determines the document is not in multi-client mode in stage 710, subroutine 630 may proceed to stage 715 where computing device 510 switch from a single-client mode to a multi-client mode.

For example, switching from single-client mode to multi-client mode may be initiated by a second client attempting to take another short-term lock on the document and seeing that that the client has already received the document. Switching to multi-client mode may include computing device 510 receiving the document and transition ID at cache 526. In this instance computing device 510 may actually be a second client computing device. After receiving the transition ID, computing device 510 may write the transition ID to the transition table, and write to the database information indicating the second client has joined the editing session and is now working on the document.

If computing device 510 determines the document is in multi-client mode in stage 710, subroutine 630 may continue to stage 720 where computing device 510 may adds the client as the "nth" client. For example, adding the "nth" client may include computing device 510 receiving the document and transition ID, and writing to the database information indicating the "nth" client has joined the editing session.

From stage 715 where computing device 510 switches from single-client mode to multi-client mode or stage 720 where computing device 510 adds the "nth" client, subroutine 630 may advance to stage 730 where computing device 510 may return to stage 640 (FIG. 6).

Reference may be made throughout this specification to "one embodiment," "an embodiment," "embodiments," "an aspect," or "aspects" meaning that a particular described feature, structure, or characteristic may be included in at least one embodiment of the present disclosure. Thus, usage of such phrases may refer to more than just one embodiment or aspect. In addition, the described features, structures, or characteristics may be combined in any suitable manner in one or more embodiments or aspects. Furthermore, reference to a single item may mean a single item or a plurality of items, just as reference to a plurality of items may mean a single item. Moreover, use of the term "and" when incorporated into a list is intended to imply that all the elements of the list, a single item of the list, or any combination of items in the list has been contemplated.

Embodiments of the disclosure may be implemented as a computer process (method), a computing system, or as an article of manufacture, such as a computer program product or computer readable media. The processes (programs) can be implemented in any number of ways, including the structures described in this document. One such way is by machine operations, of devices of the type described in this document. Another optional way is for one or more of the individual operations of the methods to be performed on a computing device in conjunction with one or more human operators performing some of the operations. These human operators need not be collocated with each other, but each can be only with a machine that performs a portion of the program.

The computer program product may be a computer storage media readable by a computer system and encoding a computer program of instructions for executing a computer process. The computer program product may also be a propagated signal on a carrier readable by a computing system and encoding a computer program of instructions for executing a computer process. The term computer readable media as used herein includes both storage media and communication media.

Those skilled in the art will appreciate that the disclosure may be practiced with other computer system configurations, including hand-held devices, multiprocessor systems, microprocessor-based or programmable consumer electronics, minicomputers, mainframe computers, and the like. The disclosure may also be practiced in distributed computing environments where tasks are performed by remote processing devices that are linked through a communications network. In a distributed computing environment, program modules may be located in both local and remote memory storage devices. Generally, program modules include routines, programs, components, data structures, and other types of structures that perform particular tasks or implement particular abstract data types.

What is claimed is:

1. A method for retrieval of presence metadata, the method comprising:
   receiving a request from a first client to edit a document file;
   sending short-term check out metadata to the first client to begin an editing session; and
   writing a transition ID to a transition table stored in a cache, wherein the presence of the transition ID in the cache indicates that a document has switched from a single-client mode to a multi-client mode;
   receiving a ping from the first client to determine if the transition ID is in the cache;
   if the transition ID is not in the cache,
      receiving a plurality of pings from the first client at regular intervals, and
      saving the document to a server a plurality of times without incurring reads/writes to a database, and
   if the transition ID is in the cache,
      receiving a plurality of pings from the first client to collect a lock table from a database to identify a second client, and
   in a separate web service request, receiving the second client's lock information.

2. The method of claim 1, wherein receiving the second client's lock information comprises receiving a ping from the second client.

3. The method of claim 1, wherein switching from the single-client mode to the multi-client mode including a second client further comprises:
   attempting to take another short-term lock on the document and seeing that the second client has already received the document;
   determining if the multi-client mode is in progress by checking a database.

4. The method of claim 3, further comprising:
   if the multi-client mode is not in progress,
      sending the document and transition ID to the second client,
      writing another transition ID to the transition table, and
      writing to the database information indicating the second client has joined the editing session; and
   if the multi-client mode is in progress,
      sending the document and transition ID to other clients who are part of the editing session, and
      writing to the database information indicating the second client has joined the editing session.

5. The method of claim 1 further comprising refreshing the cache by updating the transition table.

6. The method of claim 5, wherein updating the transition table comprises:
pinging the cache to check for the presence of transition ID in the cache; and
if the transition ID is not present in the cache, determining if the cache has been refreshed within a predetermined time interval;
when the cache has been refreshed within the predetermined time interval, respond to the ping from the cache, and
when the cache has not been refreshed within the predetermined time interval, fetch the transition table corresponding to the document's content database.

7. The method of claim 1, wherein the ping from the first client is an "am I alone" ping.

8. A system including a cache infrastructure for retrieval of presence metadata, the system comprising:
a memory storage unit; and
a processing unit coupled to the memory storage unit, wherein the processing unit is operative to:
receive short-term check out metadata from a first client to begin an editing session for a document;
add a transition ID to the short-term check out metadata;
write the transition ID to a transition table stored in a cache,
switch from a single-client mode to a multi-client mode, wherein switching from the single-client mode to the multi-client mode comprises the processing unit being operative to notice when the first client attempts to take another short-term lock on the document and seeing that that a second client has already received the document;
determine if the multi-client mode is in progress by checking a database;
receive a ping from the first client to determine if the transition ID is in the cache;
if the transition ID is not in the cache,
receive pings from the first client at regular intervals, and
save the document to a server a plurality of times without incurring any reads/writes to the database, and
if the transition ID is in the cache,
receive a ping from the first client to collect a lock table from the database to identify the second client, and
receive the second client's lock information by receiving pings that do not carry lock information.

9. The system of claim 8, further comprising the processing unit being operative to:
if the multi-client mode is not in progress,
send the document and transition ID to the second client,
write the transition ID to the transition table, and
write to the database information indicating the second client has joined the editing session; and
if the multi-client mode is in progress,
send the document and transition ID to other clients that are part of the editing session, and
write to the database information indicating the second client has joined the editing session.

10. The system of claim 8, further comprising the processing unit being operative to refresh the cache by updating the transition table.

11. The system of claim 10, wherein updating the transition table comprises the processing unit being operative to:
receive a ping from the first client to check for the presence of transition ID in the cache; and
if the transition ID is not present in the cache, determine if the cache has been refreshed within a predetermined time interval;
if the cache has been refreshed within the predetermined time interval, respond to the ping from the cache, and
if the cache has not been refreshed within the predetermined time interval, fetch the transition table corresponding to the document's content database.

12. The system of claim 8, wherein the ping from the first client is an "am I alone" ping.

13. A client computer for retrieval of metadata relating to a multi-client editing session, the client computer comprising:
a memory unit; and
a processing unit operative to:
receive a document from a storage device, the document comprising short-term check out metadata indicating an editing session has begun;
ping a cache to determine if another transition ID is stored in the cache; and
send a transition ID to a transition table stored in a cache if the another transition ID is not stored in the cache to switch from a single-client mode to a multi-client mode;
determine if more than one another transition ID is in the cache;
if more than one another transition ID is in the cache, write to a database information indicating a second client has joined the editing session;
refresh the cache by updating the transition table; wherein updating the transition table comprises the processing unit being operative to:
ping the cache to check for the presence of another transition ID in the cache; and
if the another transition ID is not present in the cache, determine if the cache has been refreshed within a predetermined time interval;
if the cache has been refreshed within the predetermined time interval, respond to the ping from the cache, and
if the cache has not been refreshed within the predetermined time interval, fetch the transition table corresponding to the document's content database.

14. The client computer of claim 13, wherein, if the transition ID is not in the cache the processing unit is further operative to:
ping the storage device at regular intervals, and
save the document to the storage device a plurality of times without incurring any reads/writes to a database.

15. The client computer of claim 13, wherein if the another transition ID is in the cache the processing unit is further operative to:
ping the storage device to collect a lock table from a database to identify a first client; and
submit the client's lock information in a separate service request.

16. The client computer of claim 15, wherein submitting the first client's lock information comprises the processing unit being further operative to submit pings to the storage device.

17. The client computer of claim 13, wherein switching from the single-client mode to the multi-client mode comprising the processing unit being further operative to:
attempt to take another short-term lock on the document; and
see that that a first client has already received the document.

18. The client computer of claim 13, wherein the ping is an "am I alone" ping.

19. The client computer of claim 15, wherein the lock table further includes one or more client identifiers.

20. The client computer of claim 19, wherein the one or more client identifiers are associated with one or more data unit locks.

* * * * *